United States Patent

[11] 3,629,102

| [72] | Inventors | James L. Lummus;<br>John N. Ryals, both of Tulsa, Okla. |
|---|---|---|
| [21] | Appl. No. | 650,056 |
| [22] | Filed | June 29, 1967 |
| [45] | Patented | Dec. 21, 1971 |
| [73] | Assignee | Pan American Petroleum Corporation<br>Tulsa, Okla. |

[54] PREVENTING LOSS OF DRILLING FLUID TO DRILLED FORMATIONS
11 Claims, 1 Drawing Fig.

[52] U.S. Cl. .................................................. 252/8.5 LC,
175/72
[51] Int. Cl. ....................................................... C10m 3/08,
C10m 1/14
[50] Field of Search ............................................. 252/8.5 LC;
175/72

[56] References Cited
UNITED STATES PATENTS

| 2,811,488 | 10/1957 | Nestle et al. ................ | 252/8.5 |
|---|---|---|---|
| 2,815,079 | 12/1957 | Goins et al. ................. | 252/8.5 |
| 2,943,679 | 7/1960 | Scott et al. .................. | 252/8.5 |
| 2,943,680 | 7/1960 | Scott et al. .................. | 252/8.5 |
| 3,042,608 | 7/1962 | Morris ........................ | 252/8.5 |
| 3,375,888 | 4/1968 | Lummus ..................... | 166/294 |

OTHER REFERENCES

Green, Which Lost Circulation Materials to Use, Article in the Oil and Gas Journal, Vol. 57, No. 10, March 2, 1959, pages 110, 111, 114 and 115

*Primary Examiner*—Herbert B. Guynn
*Attorneys*—Paul F. Hawley and Buell B. Hamilton

ABSTRACT: In well drilling operations, loss of whole drilling fluid to drilled formations is decreased by maintaining in the drilling fluid a three-component mix. The three components are (1) Ground nutshells or equivalent passing the shale shaker screen but retained on a No. 100 U.S. standard sieve; (2) Nutshell flour or equivalent passing a No. 100 sieve; (3) Sugar cane fibers, preferably waterproofed, ground fine enough to pass the shale shaker screen but coarse enough to seal a bed of BB shot when combined within certain limits with the larger granular particles and the flour.

PATENTED DEC 21 1971 3,629,102
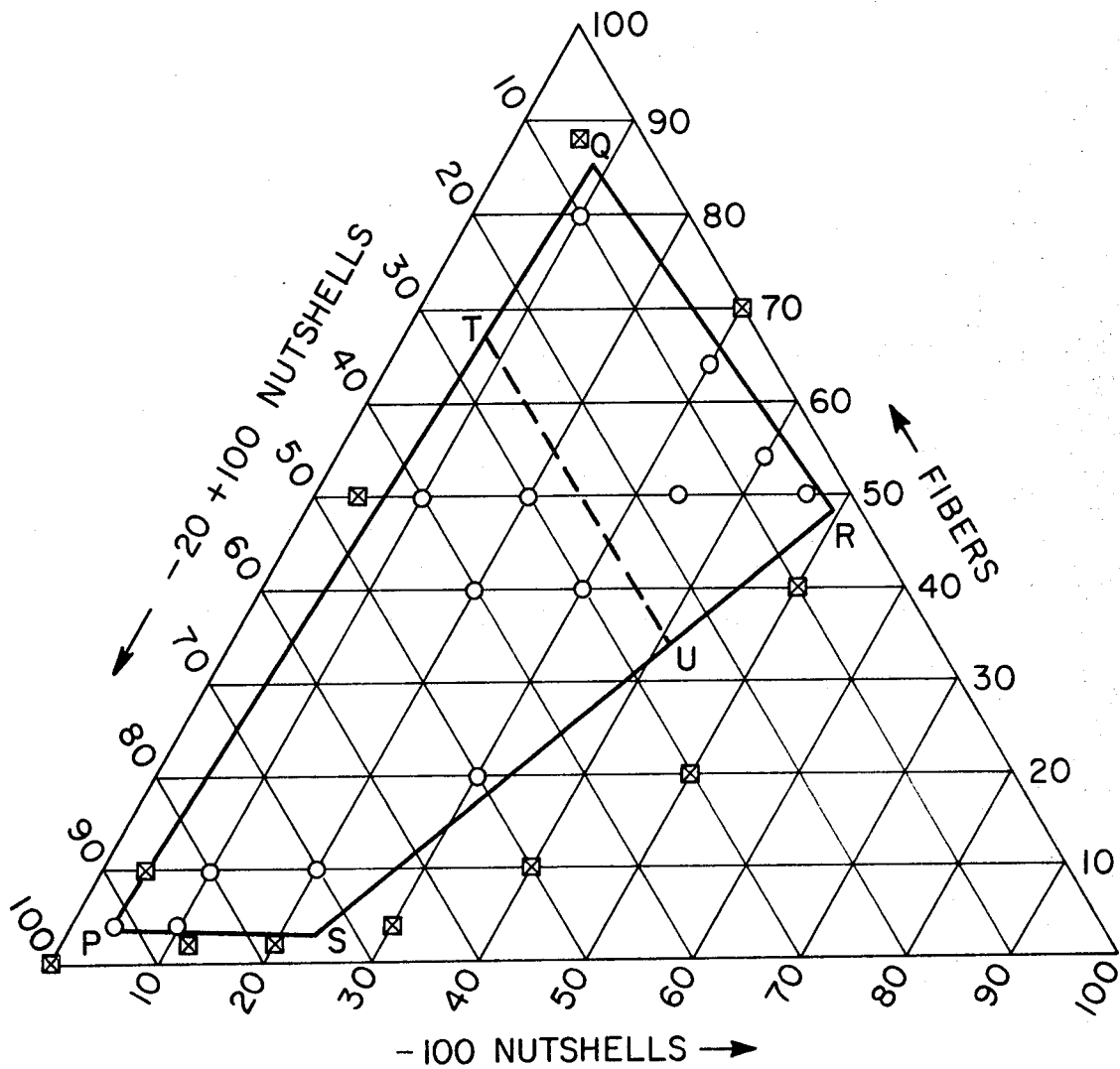
JAMES L. LUMMUS
JOHN N. RYALS
INVENTORS
BY Buell B. Hamilton
ATTORNEY

PREVENTING LOSS OF DRILLING FLUID TO DRILLED FORMATIONS

Wells, such as oil wells, are usually drilled by the rotary method in which a drilling fluid is circulated in the well during drilling operations. Conditions often occur which cause whole mud to be lost to the drilled formations. This is known as lost circulation. Materials added to the drilling fluid to stop the loss are called lost circulation recovery materials, or sometimes simply lost circulation materials or additives. It is advantageous to maintain a lost circulation material continuously in the drilling fluid. This is because it is usually much easier to stop lost circulation as soon as it occurs rather than after mud flow has enlarged flow channels. It has been previously proposed in U.S. Pat. No. 2,943,679 Scott et al. to maintain ground nutshells continuously in drilling fluids for this purpose. The nutshells are ground fine enough to pass a shale shaker screen so they can remain in the circulating drilling fluid.

The nutshells are intended to bridge and seal fractures, crevices and the like in hard formations. They have enjoyed great commercial success in such applications. Sometimes, however, mud is lost to poorly consolidated or other highly permeable formations where the flow channels are between more or less spherical or granular particles packed together. Even if such openings are rather small, the finely ground nutshells may not seal them.

An object of this invention is to provide a lost circulation composition for use in drilling fluids, which composition can be maintained continuously in the drilling fluid to seal both fractures and intergranular permeability. Other objects will be apparent from the following description and claims.

We have found that ground nutshells can be made to seal both types of lost circulation channels by adding two materials to the ground nutshells. One material is a very specific type of finely ground fibers. The other is very finely ground, strong but deformable, particles. The three ingredients must be used within critical limits.

In the drawing, the limits of the three ingredients are shown. The FIGURE PQRS defines the limits which must be observed if the intergranular permeability in ordinary BB shot is to be sealed. The circles in the drawing show compositions which sealed the BB bed while the squares with crosses show compositions which did not seal the BB bed.

In the test, a cylinder with an internal diameter of about 3 inches was mounted with its axis vertical. An internal shoulder on the bottom of the cylinder supported a metal disc perforated with holes one-fourth inch in diameter. A No. 10 U.S. standard sieve screen was placed over the perforated plate. On the top of the screen 1,000 grams of ordinary BB shot 0.173 inch in diameter were placed. The shot was leveled and was tamped to get the closest packing of the shot. The depth of the BB bed was about 1¾ inches. The mixture to be tested was stirred into a bentonite slurry having an apparent viscosity of about 25 centipoises as measured by a Fann viscosimeter (one-half the 600 r.p.m. reading). In the tests, the concentration of the additive in the mud was about 10 pounds per barrel of mud. The resulting drilling fluid was poured on top of the BB bed. A cap was placed on the cylinder and pressure was applied through an opening in the cap. The pressure was raised slowly from atmospheric pressure to about 100 pounds per square inch gauge over a period of about a minute. If a seal was formed so liquid stopped dripping from the bottom of the cylinder before about 900 milliliters of mud flowed through, and if the seal held for 10 minutes, the test was considered successful. If a seal did not form and mud continued to run or drip so about 900 milliliters of mud was lost before 10 minutes, then the test was considered a failure.

From examination of the FIGURE PQRS in the drawing, it will be apparent that at least a small amount of all three ingredients must be present in order for the BB bed to be sealed. Except for a rather low maximum on the finely ground granules of strong deformable material, the limits on the composition are rather broad.

All compositions within FIGURE PQRS sealed a slot 0.03 inch wide in a plate mounted in the bottom of the cylinder in place of the perforated plate, screen and BB bed. The sealing test was run with the slotted plate in exactly the same way as with the BB bed. It may seem somewhat surprising that the composition will seal a 0.03-inch slot since the opening in a No. 20 mud screen used on a shale shaker is 0.03 inch and substantially all the composition passed through such a mud screen. The explanation is that the mud screen is shaken violently while the slot in the test is not. The stationary slot is believed to be a valid test of field conditions since a fracture or crevice in a drilled formation is also stationary.

Even more surprisingly, it was found that if at least about 25 percent of the −20+100 nutshells were used in the slot test, the composition sealed not only a 0.03-inch slot, but also sealed a 0.04-inch slot. For several years, drillers have jokingly asked for something which would pass a mud screen but would seal a one-fourth inch slot. Our composition will not do quite this, but the preferred composition will pass a shale shaker screen and still seal a stationary slot considerably bigger than the opening in the shale shaker screen. The preferred composition is defined by the FIGURE PTUS in the drawing.

It should be pointed out that the composition must pass a shale shaker screen when the composition is suspended in a drilling fluid. Many fibers will pass a screen when dry, but will not pass the screen when wet. Thus, in testing a composition to determine whether it will pass a shale shaker screen, the material should be mixed thoroughly into a drilling fluid and the entire drilling fluid poured through the shaking screen. This again is simply duplicating conditions of use in the field.

Of course, three specific materials were used in the tests which provided the data plotted in the drawing. One of these was ground granular, black walnut shell particles distributed throughout the range from those barely passing a No. 20 U.S. standard sieve to those barely retained on a No. 100 U.S. standard sieve. The particle-size distribution of the material actually used is shown in table I.

TABLE I

| Particle Size | Wt. Percent |
|---|---|
| +20 | 0.3 |
| −20+30 | 38.2 |
| −30+40 | 20.1 |
| −40+60 | 25.1 |
| −60+80 | 8.7 |
| −80+100 | 4.0 |
| −100 | 3.6 |
|  | 100.0 |

In the above sieve analysis, +20 means the amount retained on a No. 20 sieve, −20+30 means the amount passing a No. 20 but retained on a No. 30 sieve, for example, and −100 means the amount passing a No. 100 sieve. It will frequently be convenient to refer to −20+100 mesh material, for example. This is material passing a No. 20 U.S. standard sieve and retained on a No. 100 sieve.

The fibers used in the tests, the results of which are shown in the drawing, represented those preferred for our purposes. These were sugar cane fibers (bagasse), from which the sugar had been removed and which had been waterproofed and treated against dry rot, termites, and the like, in the manner used in preparing the fibers for wallboard manufacture. As a matter of fact, the source of the fibers used was what is called router dust from forming grooves, bevels, and the like, on boards, tiles and the like made from the fibers. The term "dust" is somewhat misleading since some of the fibers were as much as about one-fourth inch long. Naturally, these would not pass a mud screen. As a matter of fact, only a small amount of the router dust screened dry through a No. 20 U.S. standard sieve would pass through a 20-mesh mud screen when the fibers were suspended in mud and were, therefore, wet. It was necessary to dry-screen the router dust through a No. 40 sieve in order to cause it to pass through a 20-mesh mud screen when the fibers were suspended in water or mud. The tests were run with this router dust screened dry through a No. 40 U.S. standard sieve.

The third constituent of the mixture was the very finely ground particles of strong but deformable material. The material used in the tests was actually the portion of ground, black walnut shells which would pass a No. 100 U.S. standard sieve. It was found that ground shale and ground limestone were not suitable substitutes for the nutshell flour. The shale was too weak and the limestone was too hard and undeformable. More important, failure of shale and limestone to act as alternates to nutshell fines indicated that finely divided bit cuttings will not perform the functions of the nutshell flour in sealing granular permeability. The nutshell flour or a suitable alternate must be present. It will be observed that when the −20+100 mesh granules are nutshells and the −100 mesh granules are also nutshells, the drilling fluid composition may be regarded as a two-component mix of nutshells and fibers. The main reason for considering the coarse and fine nutshells as separate materials is that normal once-through grinding operations cannot be adjusted to produce most of the ratios of coarse to fine nutshells falling within the bounds of FIGURE PQRS in the drawing.

Alternate materials to the nutshells, whether −20+100 mesh, or −100 mesh material, should meet the requirements set forth in U.S. Pat. No. 2,943,679. That is, the particles should be water-resistant and oil-resistant, should have a compressive strength of at least about 5,000 pounds per square inch, should have a modulus of elasticity of at least about 10,000 pounds per square inch, should have a hardness between about 2 and about 5 on the Mohs scale, and should have a specific gravity between about 0.8 and about 2.0 compared to water. In addition to having the properties listed in U.S. Pat. No. 2,943,679, the −100 mesh material should also be malleable. That is, it should deform without shattering. Failure of limestone flour to form a seal, as previously noted, indicates the need for the particles in the flour to be deformable. In addition to ground nutshells, other suitable materials include natural and synthetic rubber, synthetic resins such as polystyrene, and the like.

When considering the particle-size distribution of the −20+100 mesh material, changes in drilling technology since the time of filing U.S. Pat. No. 2,943,679 must be taken into consideration. During that time, means such as hydrocyclones, centrifuges, and flocculating agents have been developed for helping shale shakers remove solids from drilling fluids. As a result, screens have considerably larger openings are now used on shale shakers than were used 12 years ago. Screens with more than 20 wires to the inch are now uncommon. Many operators use even larger screens with only 16 or even 14 wires to the inch. Even coarser screens will probably be used in the future. It is difficult, therefore, to fix a definite upper limit on the particle size of the coarser particles of granular material. The best limit is simply that not more than about 10 or 15 percent by weight of the particles should be retained on the shale shaker screen. This limit not only avoids a reduction in concentration of the large strong granular particles by removal of large particles on the mud screen, but also avoids upsetting the ratios of this component to the other two components of the mix. From about 10 percent to about 80 percent by weight of the large granules should be retained on a sieve having an opening about two-thirds the size of the shale shaker screen opening. From about 20 percent to about 90 percent by weight should pass this sieve and be retained on a No. 100 sieve. All these values are dry screening amounts. Actually, it makes little difference whether the large granules are wet or dry as far as ability to pass through a screen is concerned.

The particle-size distribution of the strong deformable or malleable particles passing a No. 100 sieve is not too critical.

If the material is ground to form some particles retained on the No. 100 sieve and some which pass through the sieve, the particle-size distribution of the portion passing the No. 100 sieve will be satisfactory. A gradation of particles from those barely passing a No. 100 sieve on down to smaller sizes will be produced in such cases. This is preferred. The screen analysis of the nutshell flour actually used is shown in table II.

TABLE II

| Particle Size | Percent by Weight |
| --- | --- |
| −100+120 | 3.1 |
| −120+170 | 19.0 |
| −170+200 | 16.3 |
| −200+230 | 9.8 |
| −230+270 | 8.4 |
| −270+325 | 11.7 |
| −325 | 31.7 |
| | 100.0 |

Average particle size and particle-size distribution of the fibers is much more difficult to define. Dry screen analysis is not accurate and can be very misleading. Much of the material retained on a sieve will be found under microscopic examination to be made up of fibers much too small to be retained on the sieve if separated from other fibers. These small fibers are retained on the sieve because they become tangled together to form balls too large to pass through even large openings when dry. When these fibers are mixed into muds, the tangled mats of small fibers will not perform the function of individual large fibers retainable on the sieve.

It is possible to determine if the fibers are too large by mixing them in drilling fluid, pouring the drilling fluid with fibers through a screen of a size to be used in the field and shaking the screen under a stream of water for a few minutes. The amount of fibers retained on the screen can then be weighted and compared to the amount added to the drilling fluid. Not more than about 10 or 15 percent by weight of the fibers should be retained on the screen in this test. The reasons for this limit are the same as those given for the limit in connection with the coarse nutshells. The wet-screening test can be used to determine if the fibers are too large or are otherwise unsuitable due to failure to pass the shale shaker screen used in the field.

The wet-screening test can also be used to obtain at least a rough idea of the particle-size distribution of the fibers. The test can be repeated with various size screens to provide the information. It is preferred, however, to use a much more direct test. This is the sealing test described above in connection with the diagram shown in the drawing. The diagram shows proportions of ingredients which should be used if the fibers are of the proper size, shape and strength. The wet-screening test determines if the fibers and large granules are too large to pass the shale shaker screen. The sealing test with BB shot determines whether the fibers are sufficiently large to cooperate with the granular particles to seal granular permeability as well as small fractures, crevices, and the like.

In connection with the ability of the composition to seal fractures, crevices, and the like, it is advisable to test the ability of any composition to seal a slot. Some of the marginal compositions falling within the limits shown in the drawing may not seal a 0.03-inch slot. All the compositions tested did seal such a slot, but in case a poor grade of fibers or granules is used, the composition might not seal such a slot. Thus, the slot-sealing test should be made as well as the BB-sealing test. As shown in the drawing, many of the better fibers and granules will form a composition which will even seal a 0.04-inch slot within the limits of the area defined as PTUS in the drawing. Some fibers and granules in ratios falling within this area may not seal a 0.04-inch slot. They should not be considered unsatisfactory for this reason alone. If any composition seals both the BB bed and a 0.03-inch slot and falls within the limits of the area PQRS in the drawing, it should be considered satisfactory for our purposes.

The term "fiber" should be considered in its broadest sense to include tough substances composed of threadlike tissue. A fiber is ordinarily thought of as a threadlike particle with a length at least something like about 10 times as great as the diameter. The router dust which is preferred for our purposes, when examined under a microscope, is found to consist mostly of such particles. Some of the larger particles, however, are obviously bundles of smaller fibers. In the bundles, the smaller fibers are parallel to each other and are attached together. These bundles have been broken up so their length may be only two or three times their diameter. This material works well in our composition. Therefore, it is obvious that the fibers may contain many particles with a length-to-diameter ratio of less than about 10 to one and still be considered to be fibers for our purposes. The average length-to-diameter ratio under microscopic examination should, however, be at least about eight to one and preferably at least about 10 to one. Again, the really important test is whether the fibers in combination with the granules will seal the BB shot and 0.03-inch slot.

The question of alternates to the waterproofed and treated bagasse can also be settled by the same sealing tests together with the wet-screening test. Bagasse itself, narrowly defined as sugar cane fibers from which the sugar has been removed, is also satisfactory but is not generally as good as the waterproofed material treated to resist dry rot, termites, and the like. The additional waterproofing and treatment make the fibers more resistant to physical deterioration and almost completely stabilizes them against bacterial attack. Router dust fibers have been stored for weeks in water without fermentation under conditions which caused fermentation of hay in a few days and even caused some fermentation of bagasse in a week or so. Since the preventive lost circulation material is to be maintained in a drilling fluid for many days, the stability of the fibers is, of course, quite important.

If bagasse is defined as sugar cane fibers substantially free from sugar, it will usually have been treated with a preservative such as boric acid and possibly a fungicide to preserve the fibers during fermentation of the sugar remaining in the fibers after most of the syrup has been squeezed out of these fibers. Therefore, further fermentation of the sugar-free fibers occurs only slowly in bagasse, even when it has not been further treated by waterproofing and adding dry rot and termite treatments, for example. Nevertheless, if the lost circulation composition contains untreated bagasse, use of a preservative, such as formaldehyde, sodium pentachlorophenate, or the like, in the drilling fluid is advisable. If the cane fibers have been waterproofed with rosin, alum, and the like, and pretreated with preservatives, addition of preservatives to the drilling fluid is rarely necessary.

Some fibers, such as the various hays and straws, are not satisfactory. This is not only because of the fermentation problem, but because when these fibers are ground fine enough to pass a shale shaker screen, the resulting particles are not of the proper shape and strength to seal BB shot when combined with granular particles. The same is true of asbestos fibers. Other fibers, such as the synthetic textile polymers, and the like, are obviously equivalents of router dust, if the synthetic fibers can be properly chopped or ground. Others, such as ground or chopped hair, hog bristles, and the like, may also be made to serve as the fiber portion of the composition. Again, the ultimate test is whether the resulting fibers will seal a BB bed and a 0.03-inch slot when combined with the granular particles.

Since the fibers can be screened only with great difficulty, it is best to manufacture a product which can be used without screening. We have found that this can be done by feeding router dust to a high-speed hammermill using a three-sixteenth inch screen in the mill. Other methods of manufacture will occur to those skilled in the art, but the one suggested produces the most satisfactory product which it has been possible to produce economically on a commercial basis.

The best range of compositions seems to have a ratio of fibers to nutshell flour of from about 2 to 1 to about 6 to 1. The preferred ratio is about 3 to 1. The preferred concentration of $-20+100$ mesh nutshells ranges from about 25 percent to about 60 percent by weight of the total composition. The best product seems to be one with about 50 percent fibers, 30 percent $-20+100$ mesh nutshells and 20 percent $-100$ mesh nutshell flour, all percentages being by weight. These weight percentage figures are for nutshells with a density of about 1.3 to 1.4 and for fibers with a density of about 1.0. If materials with other densities are used, appropriate compensations should be made so the volume percentages remain the same. This holds true, not only for the preferred ranges given immediately above, but for all the compositions falling within the FIGURE PQRS in the drawing.

The concentration of the lost circulation additive mix used in the tests was about 10 pounds per barrel of drilling fluid. This is the preferred concentration to be used in practice. The concentration is high enough to be effective but not high enough to have a serious adverse effect on the properties of the drilling fluid. An additive concentration of 5 pounds per barrel of drilling fluid formed only an unstable seal on the BB shot at a pressure differential of 100 pounds per square inch across the BB bed. This low concentration formed a good seal on a 0.03-inch slot but did not form a seal on a 0.04-inch slot even though it was the preferred mix of 50 percent fibers, 30 percent coarse nutshells and 20 percent nutshell flour.

A concentration of 15 pounds per barrel formed very excellent seals on both the BB bed and the 0.04-inch slot. The only objection to use of such a concentration was a 40 percent increase in the mud viscosity. The mud was still easily pumpable, so it is obvious that even higher concentrations, such as 20 pounds per barrel or even more, can be used in many cases. The upper concentration limit is that which forms a mud composition which is barely pumpable. This concentration will, of course, depend upon the properties of the drilling fluid into which the additive is mixed.

Since pressure differences between the well and the formation can sometimes amount to several hundred pounds per square inch, it seemed advisable to check the ability of the additive to seal granular permeability at pressure differences above 100 pounds per square inch. Therefore, a 1¾-inch bed of BB shot was placed in a larger test cell capable of withstanding high pressure. In this test, 20 pounds per barrel of the commercially produced material sealed the BB bed to a pressure of 900 pounds per square inch. A concentration of 10 pounds per barrel not only sealed the BB bed at 100 pounds per square inch, but sealed $-6+8$ mesh shot to a pressure of 1,000 pounds per square inch.

The additive may be used in several ways in a drilling fluid in drilling operations. It is possible to use intermittent batches of the additive in a drilling fluid where most of the drilling fluid includes no additive. It is very much preferred, however, to include a low concentration, such as about 10 pounds per barrel, of the additive in all the drilling fluid. In this way, a drilling fluid containing the additive is circulated continuously past the exposed formations to prevent loss of fluid before it can start, rather than trying to stop the loss after it has started. Intermittent inclusion of batches of drilling fluid containing high concentrations of additive in the circulating stream containing a low concentration of additive is also possible. This makes possible use of the effects of high concentrations of the additive without the adverse effects if the high concentration was maintained in the entire drilling fluid system. At the same time, the advantages of circulating at least a low concentration of the additive continuously past the exposed formations are also obtained.

Since the additive is resistant to both oil and water, it can be used in drilling fluids in which the liquid is water, oil or mixtures of the two. The liquid should have a thickener, such as bentonite in the water, or soaps in the oil, to keep the additive particles in suspension in the drilling fluid. Otherwise, they will settle in the mud pits and be lost.

Many alternate materials and methods have been described above. It will be understood that these are given principally by way of example only. Others will be apparent to those skilled in the art. We do not, therefore, wish to be limited by these examples, but only by the terms of the following claims.

We claim:

1. A drilling fluid additive for maintaining continuously in a drilling fluid circulating through a well and shale shaker for stopping loss of whole drilling fluid to both intergranular permeability and to fractures, crevices, and the like, said additive consisting of ground sugar can fibers substantially free from sugar, finely divided strong, malleable granules capable of passing a No. 100 U.S. standard sieve, and relatively coarse, strong granules retainable on a No. 100 U.S. standard sieve, said granules being ground solid material, water-resistant and oil-resistant, selected from the group consisting of nutshells, natural and synthetic rubber and synthetic resins and having a compressive strength of at least about 5,000 pounds per square inch, having a modulus of elasticity of at least about 10,000 pounds per square inch, having a hardness between about 2 and about 5 on the Mohs scale, and having a specific gravity between about 0.8 and about 2.0 compared to water, the three components having concentrations lying within the FIGURE PQRS in the drawing, said relatively coarse granules being distributed in size so that not more than about 15 percent by weight are retained on a No. 20 U.S. standard sieve, from about 10 percent to about 80 percent will pass a No. 20 U.S. standard sieve and be retained on a No. 30 U.S. standard sieve and from about 20 percent to about 90 percent by weight will pass a No. 30 U.S. standard sieve, and said sugar can fibers being ground sufficiently fine so that at least about 85 percent by weight of the fibers will pass a No. 20 U.S. standard sieve while shaking the sieve under a stream of water and said fibers being ground sufficiently coarse so they will seal a 1¾ inch deep bed of BB's having a diameter of about 0.173 inch with a 100-pound per square inch differential pressure across the bed when said fibers are used in combination with the fine and coarse granules in a drilling fluid using about 50 percent fibers, 30 percent coarse granules and 20 percent fine granules, all percentages being by weight, and when the total concentration of the three components in said drilling fluid is about ten pounds per barrel of drilling fluid.

2. The drilling fluid additive of claim 1 in which said coarse and fine granules are ground nutshells.

3. The drilling fluid additive of claim 1 in which the sugar cane fibers have been waterproofed.

4. The drilling fluid additive of claim 3 in which the sugar can fibers are ground wallboard made of sugar cane fibers.

5. The drilling fluid additive of claim 4 in which said fine and coarse granules are ground nutshells.

6. A pumpable drilling fluid suitable for circulating through a well and shale shaker during drilling operations, said composition consisting of a liquid selected from the group consisting of water, oil, and mixtures of the two, the additive of claim 1 in a concentration of at least about 5 pounds of additive per barrel of drilling fluid and sufficient of a thickening agent for said liquid to maintain said additive in suspension in said drilling fluid.

7. The drilling fluid of claim 6 in which the concentration of said additive is at least about 10 pounds per barrel of drilling fluid and in which said coarse and fine granules are ground nutshells.

8. The drilling fluid composition of claim 6 in which the concentration of said additive is at least about 10 pounds per barrel of drilling fluid.

9. The drilling fluid composition of claim 8 in which the sugar cane fibers are ground wallboard made of sugar cane fibers.

10. The drilling fluid composition of claim 9 in which said fine and coarse granules are ground nutshells.

11. A method for preventing loss of whole drilling fluid to formations drilled during well-drilling operations comprising circulating continuously past the formation being drilled, through the shale shaker and back down the well, the drilling fluid of claim 6.

* * * * *